United States Patent
Doi et al.

(10) Patent No.: US 9,740,077 B2
(45) Date of Patent: Aug. 22, 2017

(54) OPTICAL MODULATOR MODULE THAT INCLUDES A PLURALITY OF OPTICAL MODULATORS

(71) Applicant: Fujitsu Optical Components Limited, Kawasaki-shi, Kanagawa (JP)

(72) Inventors: Masaharu Doi, Sapporo (JP); Yoshinobu Kubota, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/229,800

(22) Filed: Aug. 5, 2016

(65) Prior Publication Data

US 2017/0115546 A1 Apr. 27, 2017

(30) Foreign Application Priority Data

Oct. 23, 2015 (JP) ................................. 2015-208584

(51) Int. Cl.
*G02F 1/225* (2006.01)
*G02F 1/21* (2006.01)

(52) U.S. Cl.
CPC .......... *G02F 1/2257* (2013.01); *G02F 1/2255* (2013.01); *G02F 2001/212* (2013.01); *G02F 2201/12* (2013.01); *G02F 2202/20* (2013.01)

(58) Field of Classification Search
None
See application file for complete search history.

(56) References Cited

U.S. PATENT DOCUMENTS

| 5,675,673 A * | 10/1997 | Skeie | G02F 1/225 385/2 |
| 6,937,790 B2 * | 8/2005 | Bridges | G02F 1/2255 385/30 |

(Continued)

FOREIGN PATENT DOCUMENTS

| JP | 2010-130323 | 6/2010 |
| JP | 2010-185977 | 8/2010 |

(Continued)

OTHER PUBLICATIONS

Notification of Reasons for Refusal for Japanese Application No. 2015-208584 dated May 30, 2017.

*Primary Examiner* — Mike Stahl
(74) *Attorney, Agent, or Firm* — Staas & Halsey LLP

(57) ABSTRACT

An optical modulator module includes: a substrate in which a plurality of optical modulators are formed; a connector configured to include a plurality of terminals to which a plurality of signals for driving the plurality of optical modulators are input; and a relay board provided between the substrate and the connector. Each of the optical modulators includes an optical waveguide, a modulation electrode formed near the optical waveguide, and a feeder electrode electrically connected to one end of the modulation electrode. The terminals are arranged in parallel to a longitudinal direction of the substrate. Positions of respective ends of the modulation electrodes at which the respective feeder electrodes are electrically connected are the same as positions at which the respective terminals are provided in the longitudinal direction. Wiring patterns are formed on the relay board so as to electrically connect the terminals to the respective feeder electrodes.

6 Claims, 12 Drawing Sheets

(56) References Cited

U.S. PATENT DOCUMENTS

| | | | |
|---|---|---|---|
| 2004/0184694 A1* | 9/2004 | Ridgway | G02F 1/2255 385/3 |
| 2010/0129088 A1 | 5/2010 | Akasaka et al. | |
| 2010/0202722 A1 | 8/2010 | Sugiyama | |
| 2010/0202784 A1 | 8/2010 | Sugiyama | |
| 2010/0316326 A1 | 12/2010 | Sugiyama | |
| 2011/0157673 A1 | 6/2011 | Mitomi et al. | |
| 2014/0119686 A1* | 5/2014 | Sugiyama | G02F 1/2255 385/2 |
| 2015/0063809 A1* | 3/2015 | Sugiyama | H04J 14/06 398/65 |
| 2016/0054638 A1* | 2/2016 | Miyazaki | G02F 1/0123 385/2 |
| 2016/0161771 A1* | 6/2016 | Sugiyama | G02B 6/4201 385/3 |

FOREIGN PATENT DOCUMENTS

| | | |
|---|---|---|
| JP | 2010-185978 | 8/2010 |
| JP | 2010-286770 | 12/2010 |
| JP | 2014-149394 | 8/2014 |
| WO | 2010/021193 | 2/2010 |
| WO | WO 2014/119744 A1 * | 8/2014 |

* cited by examiner

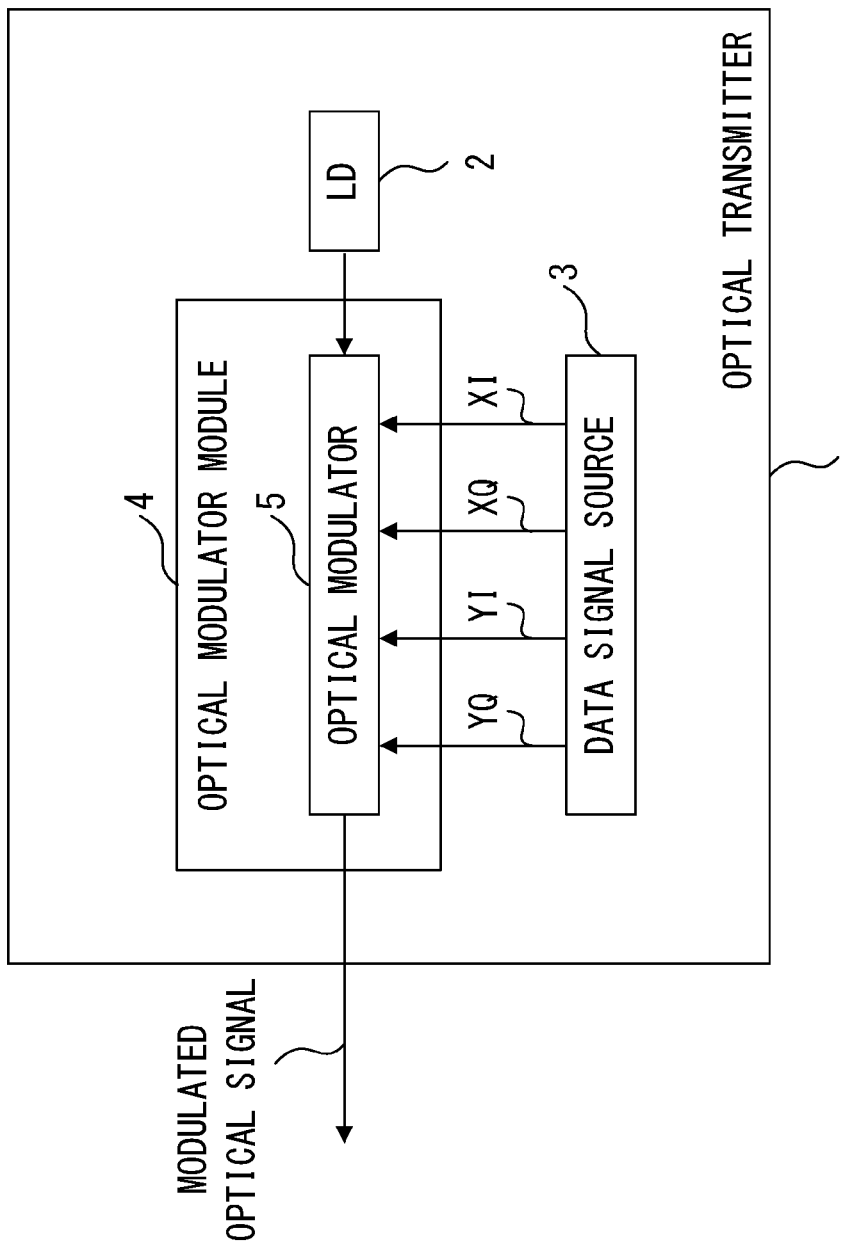
F I G. 4

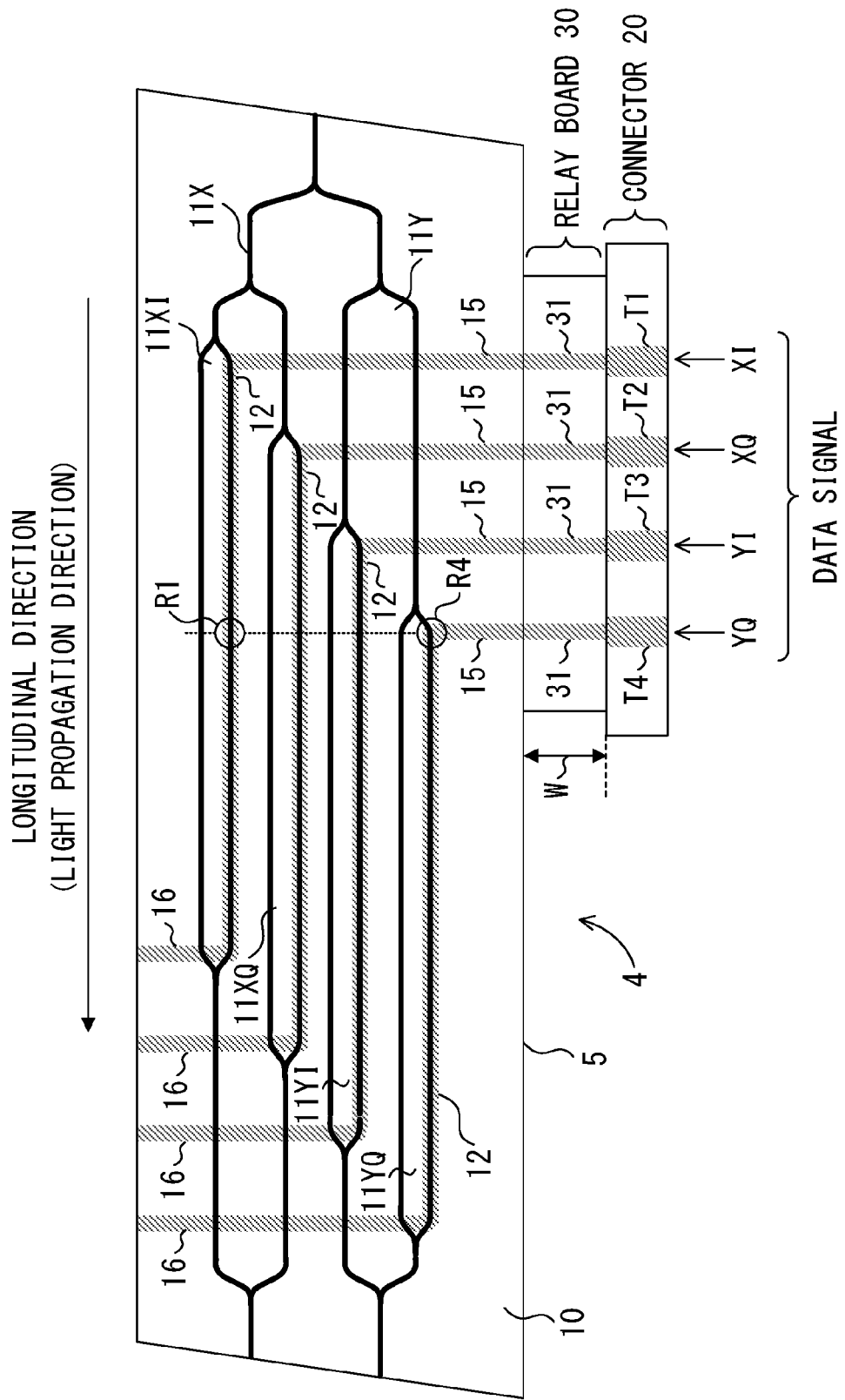
F I G. 6

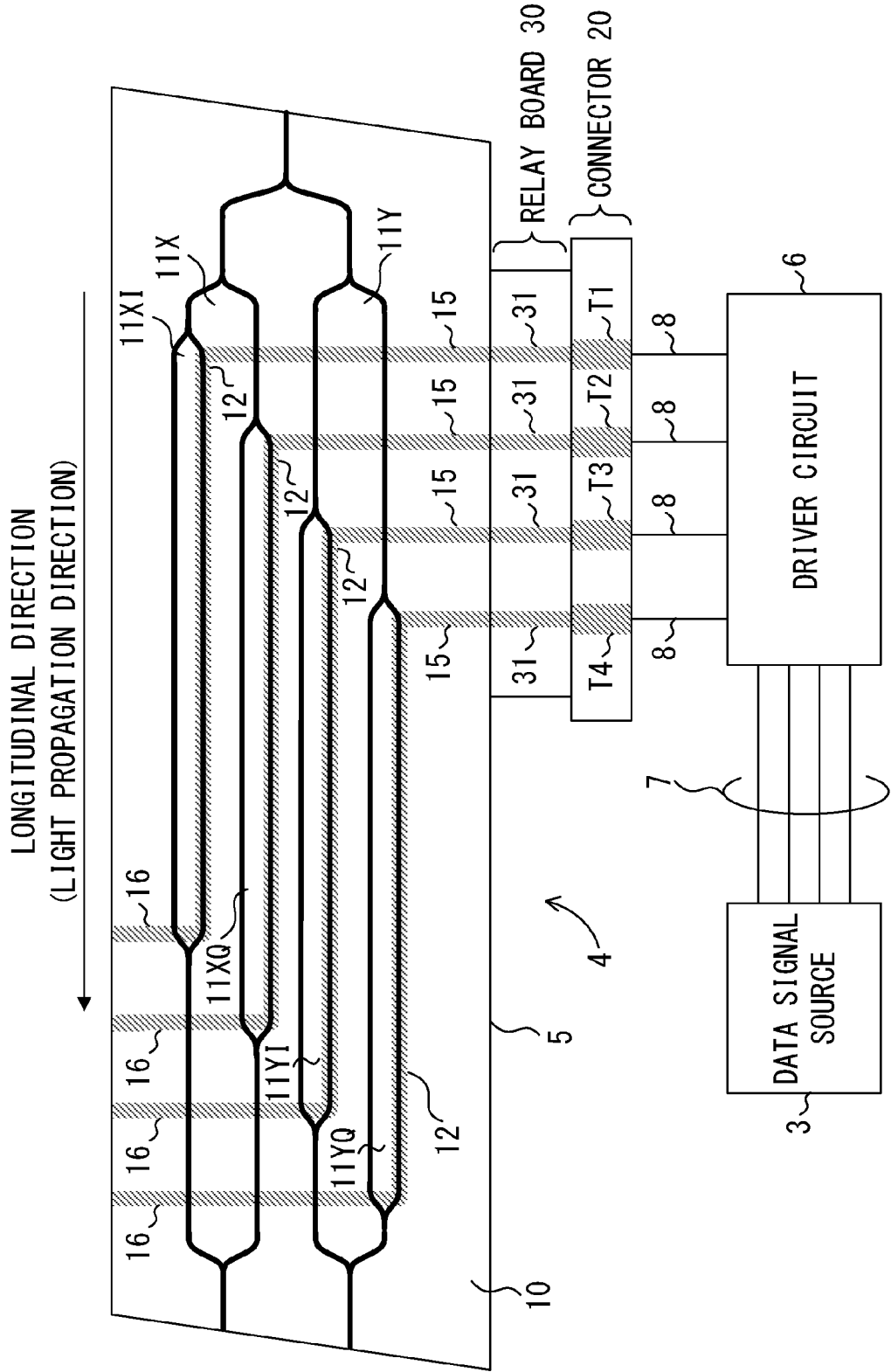
F I G. 7

OPTICAL MODULATOR MODULE THAT INCLUDES A PLURALITY OF OPTICAL MODULATORS

CROSS-REFERENCE TO RELATED APPLICATION

This application is based upon and claims the benefit of priority of the prior Japanese Patent Application No. 2015-208584, filed on Oct. 23, 2015, the entire contents of which are incorporated herein by reference.

FIELD

The embodiments discussed herein are related to an optical modulator module that includes a plurality of optical modulators.

BACKGROUND

An optical modulator is a key component for realizing high speed optical communication systems. An optical modulator is configured by using for example a LiNbO3 substrate. An optical modulator configured by using a LiNbO3 substrate is sometimes referred to as an LN modulator. LN modulators can achieve high speed modulation and low chirp, and thus have been put into practical use for optical communication systems of 10 Gbps through 40 Gbps. Also, 100 Gbps-LN modulators that generate a polarization multiplexed optical signal have also been put into practical use in order to realize data communications at higher speeds.

FIG. 1 illustrates an example of an optical modulator. The optical modulator illustrated in FIG. 1 includes a pair of Mach-Zehnder modulators 101X and 101Y in order to generate a polarization multiplexed optical signal. The Mach-Zehnder modulator 101X includes a pair of Mach-Zehnder modulators 101XI and 101XQ, while the Mach-Zehnder modulator 101Y includes a pair of Mach-Zehnder modulators 101YI and 101YQ. Each of the Mach-Zehnder modulators 101XI, 101XQ, 101YI and 101YQ includes a pair of parallel optical waveguides formed on the surface area of a substrate 100. Also, in each of the Mach-Zehnder modulators 101XI, 101XQ, 101YI and 101YQ, a signal electrode 102 is formed near one of the pair of the optical waveguides.

An input optical waveguide 103 is formed so that it branches input continuous wave light and guides the branched portions to the Mach-Zehnder modulators 101X and 101Y. The continuous wave light input to the Mach-Zehnder modulator 101X is guided to the Mach-Zehnder modulators 101XI and 101XQ, and the continuous wave light input to the Mach-Zehnder modulator 101Y is guided to the Mach-Zehnder modulators 101YI and 101YQ.

The continuous wave light input to the Mach-Zehnder modulator 101XI propagates through a pair of optical waveguides. In this situation, when a data signal is fed to the signal electrode 102 of the Mach-Zehnder modulator 101XI, the refraction index of the optical waveguide near that signal electrode 102 changes. Therefore, an optical signal output form the Mach-Zehnder modulator 101XI represents a data signal fed to the signal electrode 102. In other words, the Mach-Zehnder modulator 101XI can generate a modulated optical signal that represents a data signal. Similarly, each of the Mach-Zehnder modulators 101XQ, 101YI and 101YQ generates a modulated optical signal that represents its corresponding data signal.

Optical signals output from the Mach-Zehnder modulators 101XI and 101XQ are combined so as to be guided to an output optical waveguide 104X, while optical signals output from the Mach-Zehnder modulators 101YI and 101YQ are combined so as to be guided to an output optical waveguide 104Y. Note that phase difference $\pi/2$ may be given between the Mach-Zehnder modulators 101XI and 101XQ, and phase difference $\pi/2$ may be given between the Mach-Zehnder modulators 101YI and 101YQ.

Modulated optical signals output from the optical waveguides 104X and 104Y are combined by a polarization beam combiner 110. In other words, a polarization multiplexed optical signal is generated. The polarization beam combiner 110 may be part of the optical modulator.

Note that an optical device having a plurality of optical modulators is disclosed by for example Japanese Laid-open Patent Publication No. 2010-286770. Also, an optical modulator in which a plurality of optical modulation portions are arranged in parallel is disclosed by for example Japanese Laid-open Patent Publication No. 2010-185977.

It is sometimes demanded that the size of an optical modulator be reduced in order to make the optical transmission device compact. For example, in order to reduce the length of the substrate 100 in the propagation direction of optical signals, the signal electrodes 102 are formed in such a manner that spacing is smaller between the signal electrodes 102 in the propagation direction of optical signals as illustrated in FIG. 2. Spacing S illustrated in FIG. 2 is for example about 1 mm.

As illustrated in FIG. 3, data signals are fed to the optical modulator via a connector 120. In this example, the connector 120 is provided with terminals T1, T2, T3 and T4 to which data signals corresponding to the Mach-Zehnder modulators 101XI, 101XQ, 101YI and 101YQ are input. However, it is difficult to make the spacing (S1, S2 and S3) narrower sufficiently between the terminals of the connector 120. Note that spacing S1, S2 and S3 are 3.6 mm, 10.8 mm and 3.6 mm, respectively according to the OIF (Optical Internetworking Forum). Because of this, a relay board 130 is provided between the substrate 100 and the connector 120. On the relay board 130, wiring patterns 131 are formed so that the pitches between the terminals of the connector 120 are converted into the pitches between the signal electrodes 102 at an edge of the substrate 100.

In addition, in order to increase the quality of a polarization multiplexed optical signal generated by the optical modulator, it is preferable that skews between data signals fed to the Mach-Zehnder modulators 101XI, 101XQ, 101YI and 101YQ be adjusted to be small sufficiently. For this purpose, the relay board 130 is designed so that the respective conductive patterns (wiring patterns 131, signal electrodes 102 and electrodes between P and R (such as the electrode between P1 and R1)) have roughly the same length (propagation time), the respective conductive patterns extending from terminals T1, T2, T3 and T4 of the connector 120 to R1, R2, R3 and R4 via the modulation starting points (P1, P2, P3 and P4) of the Mach-Zehnder modulators 101XI, 101XQ, 101YI and 101YQ. In this example, modulation starting points P (P1-P4) represent the positions at which the conductive patterns arriving at the Mach-Zehnder modulators from the connector 120 via the relay board 130 first arrive at the Mach-Zehnder modulators. For example, P1 in FIG. 3 represents the modulation starting point of the Mach-Zehnder modulator 102XI, and P4 represents the modulation starting point of the Mach-Zehnder modulator 102YQ. Also, R1-R4 represent the points at which beams of light input to the optical modulator chip arrive at the respective Mach-Zehnder modulators at the same time. In such a case, the relay board 130 is designed in such a manner that the arrive time of an electric signal arriving at R1 from terminal T1 via the wiring pattern 131, the signal electrode 102 and modulation starting point P1 is roughly the same as the arrival time of an electric signal arriving at R4 from terminal T4 via the wiring pattern 131, the signal electrode 102 and modulation starting point P4.

However, making the arrival times of electric signals arriving at points R (R1-R4) of the Mach-Zehnder modulators 101XI, 101XQ, 101YI and 101YQ from the connector 120 roughly the same results in longer patterns for the wiring patterns 131 formed on the relay board 130. This also results in greater width W of the relay board 130. For example, the lengths from the connector 120 to the modulation starting points of the Mach-Zehnder modulators are in a range of approximately 5 mm through 8 mm. Also, width W of the relay board 130 is about 3 mm through 4 mm. Thus data signals may be attenuated on the routes from the connector 120 to the Mach-Zehnder modulators 101XI, 101XQ, 101YI and 101YQ. In particular, when a data signal has a high rate, that data signal may attenuate greatly.

SUMMARY

According to an aspect of the embodiments, an optical modulator module includes: a substrate in which a plurality of optical modulators are formed; a connector configured to include a plurality of terminals to which a plurality of signals for driving the plurality of optical modulators are input; and a relay board provided between the substrate and the connector. Each of the optical modulators includes an optical waveguide, a modulation electrode formed near the optical waveguide, and a feeder electrode electrically connected to one end of the modulation electrode. The plurality of terminals are arranged in parallel or approximately parallel to a longitudinal direction of the substrate. Positions of respective ends of the modulation electrodes at which the respective feeder electrodes of respective optical modulators are electrically connected are substantially the same as positions at which the respective terminals are provided in the longitudinal direction of the substrate. A plurality of wiring patterns are formed on the relay board so as to electrically connect the plurality of terminals to the respective feeder electrodes of the optical modulators.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of an optical transmitter including an optical modulator module according to an embodiment;

FIG. 6 illustrates an example of an optical modulator module according to the first embodiment;

FIG. 7 illustrates an example of a configuration for adjusting skews between data signals;

DESCRIPTION OF EMBODIMENTS

Figure 1:
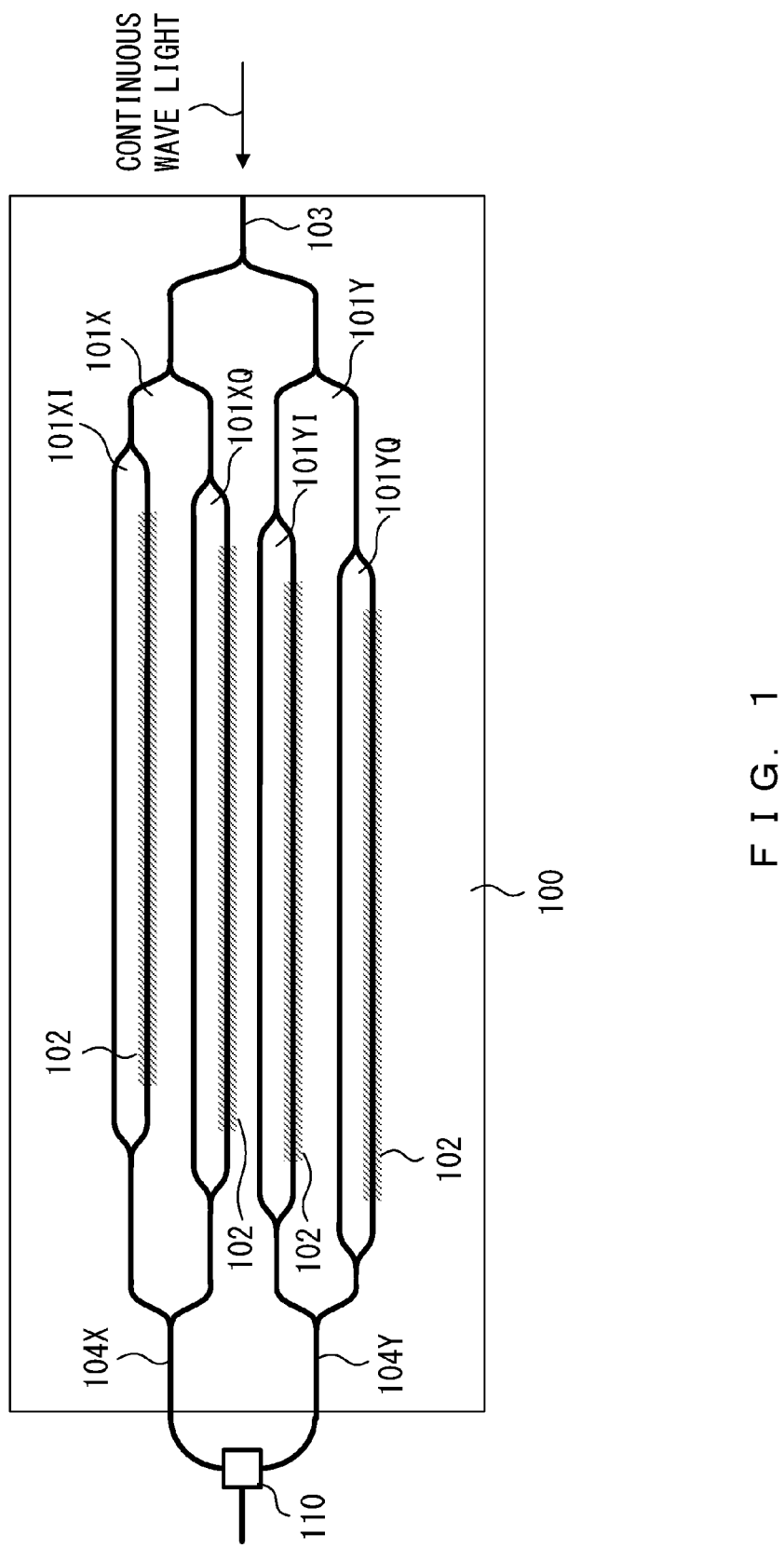
FIG. 1 illustrates an example of an optical modulator.

FIG. 4 illustrates an example of an optical transmitter including an optical modulator module according to an embodiment of the present invention. An optical transmitter 1 includes a laser light source (LD) 2, a data signal source 3, and an optical modulator module 4 in order to generate a modulated optical signal as illustrated in FIG. 4.

In this example, the laser light source 2 generates continuous wave light of a specified optical frequency. The data signal source 3 generates a data signal. In this example, the optical transmitter 1 generates and transmits a polarization multiplexed modulated optical signal. Thus, the data signal source 3 generates data signals XI, XQ, YI and YQ. Then, data signals generated by the data signal source 3 are fed to the optical modulator module 4 via a driver (not illustrated). Each data signal is used as a drive signal for driving the optical modulator module 4.

The optical modulator module 4 includes an optical modulator 5, and modulates continuous wave light generated by the laser light source 2 in accordance with a data signal so as to generate a polarization multiplexed modulated optical signal. Specifically, the optical modulator module 4 generates modulated optical signal X based on data signals XI and XQ, and generates modulated optical signal Y based on data signals YI and YQ. Then, modulated optical signals X and Y are combined by a polarization beam combiner (not illustrated).

First Embodiment

Figure 5:
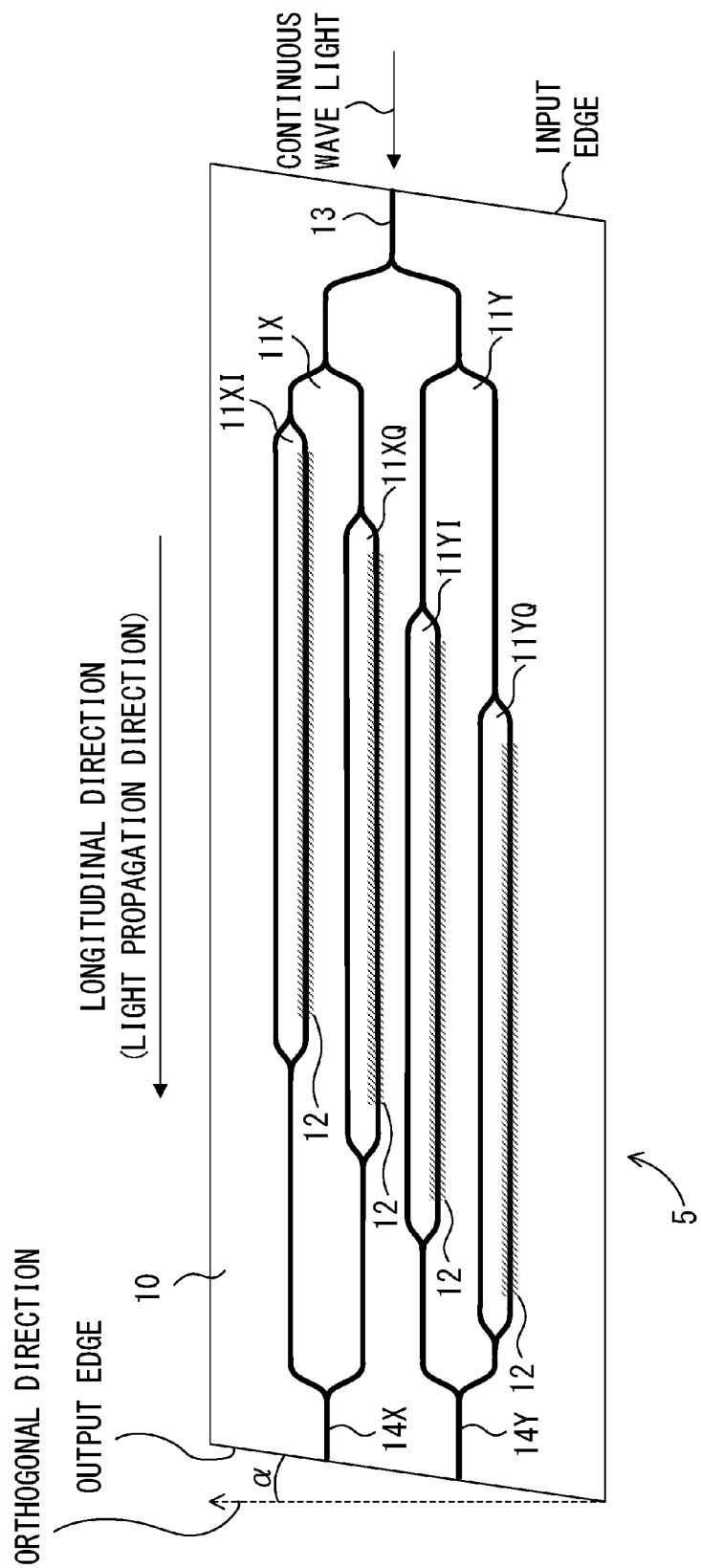
FIG. 5 illustrates an example of an optical modulator that is implemented on an optical modulator module according to a first embodiment.

FIG. 5 illustrates an example of an optical modulator that is implemented on an optical modulator module according to a first embodiment. Note that continuous wave light generated by the laser light source 2 illustrated in FIG. 4 is input to the optical modulator 5. Also, a data signal generated by the data signal source 3 illustrated in FIG. 4 is fed to the optical modulator 5.

The substrate 10 is an electro-optical substrate having an electro-optical effect, and is implemented by an electro-optical crystal such as LiNbO3 (LN) etc. Accordingly, when an electric signal is fed to the substrate 10, the optical characteristic (such as the refraction index etc.) changes in response to that electric signal. The shape of the substrate 10 is rectangular or parallelogrammic. In this example, the shape of the substrate 10 is parallelogrammic.

Note that the edge of the substrate 10 to which continuous wave light is input may be referred to as an "input edge". Also, the edge of the substrate 10 from which a modulated optical signal generated by the optical modulator 5 is output may be referred to as an "output edge". Further, the direction in which light input from the input edge propagates on the substrate 10 may be referred to as a "light propagation direction". In this example, the light propagation direction is the same as the longitudinal direction of the substrate 10. In other words, light input from the input edge propagates in the longitudinal direction of the substrate 10.

On the surface area of the substrate 10, a pair of Mach-Zehnder modulators 11X and 11Y are formed. The Mach-Zehnder modulator 11X includes a pair of Mach-Zehnder modulators 11XI and 11XQ, and the Mach-Zehnder modulator 11Y includes a pair of Mach-Zehnder modulators 11YI and 11YQ. Each of the Mach-Zehnder modulators 11XI, 11XQ, 11YI and 11YQ includes a pair of parallel optical waveguides formed on the surface area of the substrate 10. Also, in each of the Mach-Zehnder modulators 11XI, 11XQ, 11YI and 11YQ, a modulation electrode 12 is formed near one of the pair of the optical waveguides. Note that modulation electrodes 12 are part of signal electrodes for feeding data signals to the Mach-Zehnder modulators.

An input optical waveguide 13 is formed so that it branches input continuous wave light and guides the branched portions to Mach-Zehnder modulators 11X and 11Y. The continuous wave light input to the Mach-Zehnder modulator 11X is guided to the Mach-Zehnder modulators 11XI and 11XQ, and the continuous wave light input to the Mach-Zehnder modulator 11Y is guided to the Mach-Zehnder modulators 11YI and 11YQ.

The continuous wave light input to the Mach-Zehnder modulator 11XI propagates through a pair of optical waveguides. In this situation, when data signal XI is fed to the modulation electrode 12 of the Mach-Zehnder modulator 11XI, the refraction index of the optical waveguide near the modulation electrode 12 changes in response to that data signal XI. Therefore, an optical signal output form the Mach-Zehnder modulator 11XI represents data signal XI fed to the modulation electrode 12. In other words, the Mach-Zehnder modulator 11XI can generate a modulated optical signal that represents data signal XI. Similarly, the Mach-Zehnder modulators 11XQ, 11YI and 11YQ respectively generate modulated optical signals that represent their corresponding data signals XQ, YI and YQ.

Optical signals output from the Mach-Zehnder modulators 11XI and 11XQ are combined so as to be guided to an output optical waveguide 14X, while optical signals output from the Mach-Zehnder modulators 11YI and 11YQ are combined so as to be guided to an output optical waveguide 14Y. Note that a phase difference of $\pi/2$ may be given between the Mach-Zehnder modulators 11XI and 11XQ, and a phase difference of $\pi/2$ may be given between the Mach-Zehnder modulators 11YI and 11YQ, although this is not illustrated in the drawings.

Modulated optical signals output from the optical waveguides 14X and 14Y are combined by a polarization beam combiner (not illustrated). In other words, a polarization multiplexed optical signal is generated. The polarization beam combiner may be part of the optical modulator 5.

The shape of the substrate 10 is parallelogrammic in this example. Specifically, the substrate 10 is formed so that the input edge and the output edge of the substrate 10 each have angle $\alpha$ with respect to the direction orthogonal to the longitudinal direction of the substrate 10. This configuration suppresses the reflection of light on the edges of the substrate 10. In the following descriptions, the direction orthogonal to the longitudinal direction of the substrate 10 may be referred to as an "orthogonal direction".

FIG. 6 illustrates an example of the optical modulator module 4. The optical modulator module 4 includes the optical modulator 5, the connector 20 and the relay board 30 as illustrated in FIG. 6.

The optical modulator 5 has the same configuration between FIG. 5 and FIG. 6. Specifically, the optical modulator 5 includes the Mach-Zehnder modulator 11XI, 11XQ, 11YI and 11YQ. Also, in each of the Mach-Zehnder modulators 11XI, 11XQ, 11YI and 11YQ, signal electrode 12 is formed near one of the pair of the optical waveguides. Further, a feeder electrode 15 and a termination electrode 16 are formed for each of the Mach-Zehnder modulators 11XI, 11XQ, 11YI and 11YQ on the surface of the substrate 10, although this is omitted in FIG. 5.

Data signals XI, XQ, YI and YQ generated by the data signal source 3 are fed to the optical modulator 5 via the connector 20. The connector 20 includes terminals T1, T2, T3 and T4 to which data signals XI, XQ, YI and YQ are input. The connector 20 may employ a configuration defined by the OIF or may employ other configurations.

The relay board 30 is provided between the connector 20 and the optical modulator 5. On the surface of the relay board 30, wiring patterns 31 are formed so as to electrically connect terminals T1-T4 of the connector 20 and their corresponding feeder electrodes 15 formed on the surface of the substrate 10. In other words, four wiring patterns 31 are formed on the surface of the relay board 30. The shape of the relay board 30 is rectangular in this example.

One of the ends of each feeder electrode 15 is electrically connected to the end of the modulation electrode 12 of its corresponding Mach-Zehnder modulator. Also, the feeder electrodes 15 are formed to reach the edge of the substrate 10 so that they can be electrically connected to their corresponding wiring patterns 31 formed on the relay board 30.

One of the ends of each termination electrode 16 is electrically connected to the end of the modulation electrode 12 of its corresponding Mach-Zehnder modulator. Also, the termination electrodes 16 are formed to reach the edge of the substrate 10 and are terminated.

As described above, the modulation electrode 12, the feeder electrode 15 and the termination electrode 16 are formed for each of the Mach-Zehnder modulators 11XI, 11XQ, 11YI and 11YQ. Note that the modulation electrode 12, the feeder electrode 15 and the termination electrode 16 provided for each of the Mach-Zehnder modulators 11XI, 11XQ, 11YI and 11YQ are connected electrically to each other. Therefore, a group of the modulation electrode 12, the feeder electrode 15 and the termination electrode 16 that are electrically connected to each other may be referred to as a "signal electrode".

In the optical modulator module 4, each data signal is guided to the modulation electrode 12 of its corresponding Mach-Zehnder modulator via the connector 20, the wiring pattern 31 and the feeder electrode 15. For example, data signal XI is guided to the modulation electrode 12 of the Mach-Zehnder modulator 11XI via terminal T1 of the connector 20, corresponding wiring pattern 31 and corresponding feeder electrode 15. Thus, the Mach-Zehnder modulators 11XI, 11XQ, 11YI and 11YQ can respectively generate modulated optical signals that correspond to data signals XI, XQ, YI and YQ.

A data signal of each Mach-Zehnder modulator arrives at the modulation electrode 12 via the feeder electrode 15. Then, this data signal propagates through the modulation electrode 12, and the Mach-Zehnder modulator modulates input light in accordance with the data signal. Therefore, in the following descriptions, the end point of the modulation electrode 12 to which the feeder electrode 15 is connected may be referred to as a "modulation starting point".

The optical modulator module 4 according to the first embodiment is configured to satisfy the following conditions.
(1) The connector 20 is provided to the substrate 10 in such a manner that a plurality of terminals T1-T4 are arranged in parallel or in approximately parallel to the longitudinal direction of the substrate 10 (i.e., the light propagation direction on the optical modulator 5).
(2) The positions of the modulation starting points of the Mach-Zehnder modulators 11XI, 11XQ, 11YI and 11YQ are identical or approximately identical to the positions of their corresponding terminals T1, T2, T3 and T4 of the connector 20 in the longitudinal direction of the substrate 10.
(3) The routes for propagating data signals from terminals T1, T2, T3 and T4 of the connector 20 to their corresponding Mach-Zehnder modulators 11XI, 11XQ, 11YI and 11YQ are formed to have a shortest possible length.
(4) The routes for propagating data signals from the terminals T1, T2, T3 and T4 of the connector 20 to the Mach-Zehnder modulators 11XI, 11XQ, 11YI and 11YQ are formed to be parallel or approximately parallel to each other.

Regarding condition (1), terminals T1, T2, T3 and T4 of the connector 20 are arranged in parallel or approximately parallel to the longitudinal direction of the substrate 10. In other words, the connector 20 is arranged with respect to the substrate 10 in such a manner that terminals T1, T2, T3 and T4 are arrayed in parallel or approximately in parallel to the longitudinal direction of the substrate 10.

Regarding condition (2), the position of the modulation starting point of the Mach-Zehnder modulator 11XI is identical or approximately identical to the position of terminal T1 of the connector 20 in the longitudinal direction of the substrate 10. In other words, the position of one of the end points of the modulation electrode 12 of the Mach-Zehnder modulator 11XI (the endpoint to which the feeder electrode 15 is electrically connected) is identical or approximately identical to the position of terminal T1 in the longitudinal direction of the substrate 10. Similarly, the positions of the modulation starting points of the Mach-Zehnder modulators 11XQ, 11YI and 11YQ are identical or approximately identical to the positions of terminals T2, T3 and T4 of the connector 20, respectively, in the longitudinal direction of the substrate 10.

Regarding conditions (3) and (4), the four routes for propagating data signals from terminals T1, T2, T3 and T4 of the connector 20 to the Mach-Zehnder modulators 11XI, 11XQ, 11YI and 11YQ are straight or approximately straight, and formed to be parallel or approximately parallel to each other. The route between each terminal of the connector 20 and its corresponding Mach-Zehnder modulator is implemented by the wiring pattern 31 formed on the surface of the relay board 30 and the feeder electrode 15 formed on the surface of the substrate 10.

Figure 3:
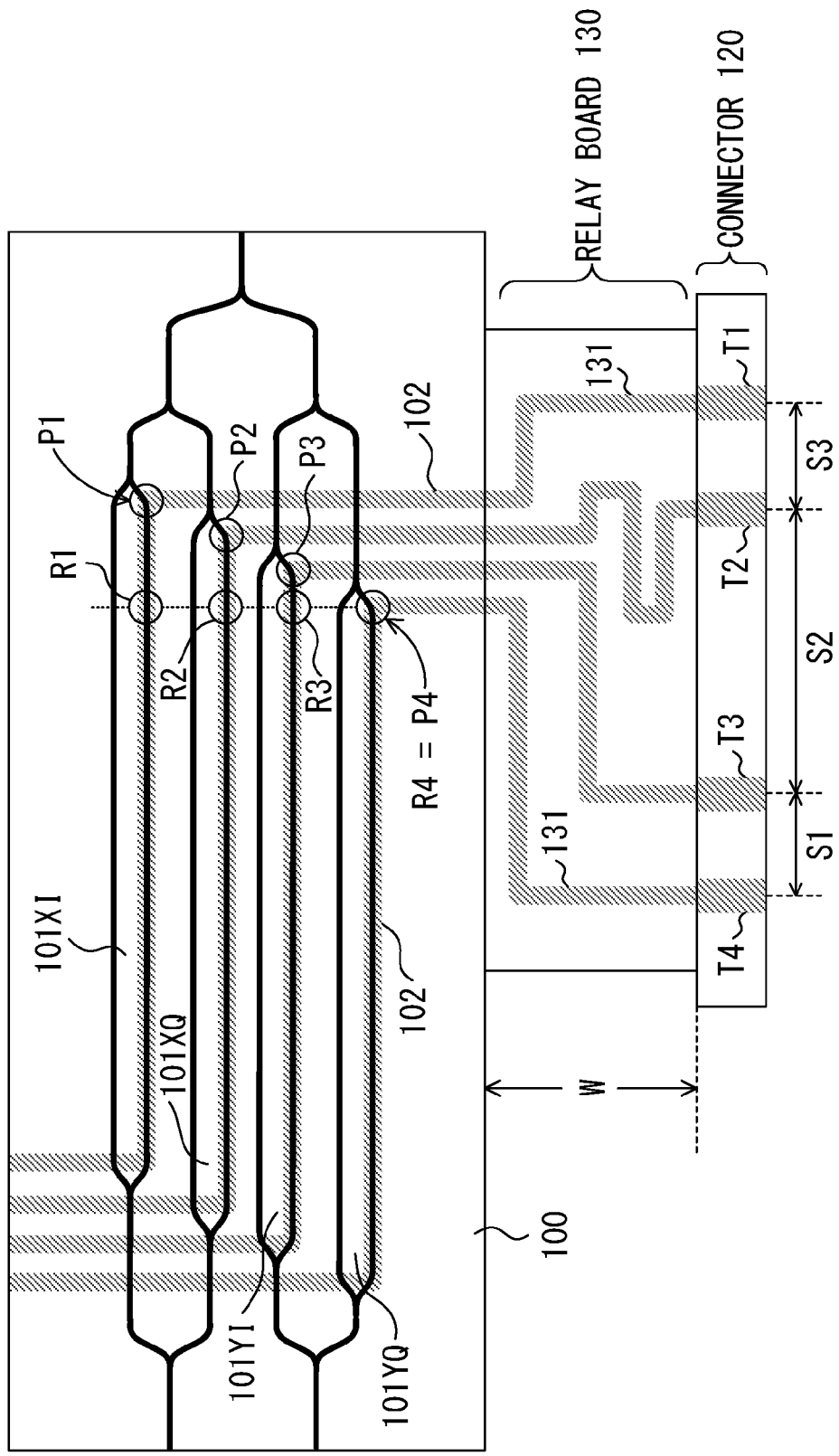
FIG. 3 illustrates an example of an optical modulator module.

Accordingly, the optical modulator module 4 of the first embodiment has routes for propagating data signals from the connector 20 to the Mach-Zehnder modulators shorter than those in the configuration illustrated in FIG. 3. In other words, because the wiring patterns are formed as almost shortest routes on the relay board 30 in the optical modulator module 4, resulting in shorter routes for propagating data signals from the connector 20 to the Mach-Zehnder modulators. In addition, the relay board 30 has width W (gap between the substrate 10 and the connector 20) that is smaller than that in the configuration illustrated in FIG. 3. For example, width W of the relay board 30 can be smaller than or equal to 2 mm. Further, the lengths of the routes for propagating data signals from the connector to the Mach-Zehnder modulators can be smaller by 2 mm through 3 mm than those in the configuration illustrated in FIG. 3. This suppresses attenuation of data signals on the routes from the connector 20 to the Mach-Zehnder modulators, leading to improvement in the quality of modulated optical signals generated by the optical modulator 5.

Note that while the example illustrated in FIG. 6 has terminals T1-T4 arranged at roughly the equal spacing in the connector 20, the first embodiment is not limited to this configuration. In other words, terminals T1-T4 do not have to be arranged at equal spacing. For example, terminals T1-T4 may be arranged as proposed by the OIF. However, even in such a case, the arrangement of the Mach-Zehnder modulators 11XI, 11XQ, 11YI and 11YQ (the positions of the modulation starting points of the Mach-Zehnder modulators 11XI, 11XQ, 11YI and 11YQ) is determined in such a manner that the positions of these modulation starting points are identical or approximately identical to the positions of their corresponding terminals T1, T2, T3 and T4 in the longitudinal direction of the substrate 10.

In the example illustrated in FIG. 6, the optical modulator module 4 has the routes from the connector 20 to the respective Mach-Zehnder modulators (arrival times) different from each other. For example, the route (arrival time) from the connector 20 to point R1 via the modulation electrode 12 of the Mach-Zehnder modulator 11XI is the longest, while the route (arrival time) from the connector 20 to point R4 via the modulation electrode 12 of the Mach-Zehnder modulator 11YQ is the shortest. Accordingly, when skews are zero between data signals XI, XQ, YI and YQ at the connector 20, skews are caused between data signals XI, XQ, YI and YQ at the Mach-Zehnder modulators 11XI, 11XQ, 11YI and 11YQ.

Accordingly, in an optical transmitter equipped with the optical modulator module 4, skews between data signals are adjusted outside the optical modulator module 4. As illustrated in FIG. 7, data signals are generated by the data signal source 3. Then, data signals output from the data signal source 3 are amplified by a driver circuit 6 and are guided to the connector 20 in this example. Note that the data signal source 3 and the driver circuit 6 are connected by four signal lines 7. Also, the driver circuit 6 and the connector 20 are connected by four signal lines 8. In such a case, the skews between data signals are adjusted by one of the following methods.
(1) The data signal source 3 outputs data signals XI, XQ, YI and YQ at different timings or in different phases so that skews caused between the connector 20 and the Mach-Zehnder modulators 11XI, 11XQ, 11YI and 11YQ are compensated for.
(2) The lengths of the four signal lines 7 between the data signal source 3 and the driver circuit 6 are determined so that skews caused between the connector 20 and the Mach-Zehnder modulators 11XI, 11XQ, 11YI and 11YQ are compensated for.
(3) The lengths of the four signal lines 8 between the driver circuit 6 and the connector 20 are determined so that skews caused between the connector 20 and the Mach-Zehnder modulators 11XI, 11XQ, 11YI and 11YQ are compensated for.

Next, an example of a manufacturing process of the optical modulator module 4 will be described. An example of the substrate 10 is a Z-cut LiNbO3 substrate. Ti is patterned into optical waveguides in the surface area of the substrate 10 so that patterned Ti is diffused thermally, and thus optical waveguides are formed. When a polarization inversion area, which will be described later, is to be formed on the substrate 10, a resist is formed on an area in which the polarization inversion area is not to be formed, and a high voltage is applied to the substrate 10. This high voltage inverts the polarization in the area in which the resist is not formed. Thereafter, a buffer layer such as a SiO2 layer is formed on the surface of the substrate 10. Further, electrodes (including the modulation electrodes 12, the feeder electrodes 15 and the termination electrodes 16) are formed on the upper surface of the buffer layer by a plating process.

Between the connector 20 and the relay board 30, the terminals and their corresponding wiring patterns 31 are electrically connected via for example soldering. Also, between the relay board 30 and the substrate 10, the wiring patterns 31 and their corresponding termination electrodes 16 are electrically connected via for example wire bonding.

Second Embodiment

The quality of a modulated optical signal generated by an optical modulator may deteriorate due to chirp. Specifically, when light to be modulated by an optical modulator propagates in an optical waveguide, the optical frequency thereof may change. In view of this, a configuration that suppresses chirp in an optical modulator is proposed.

Figure 8:
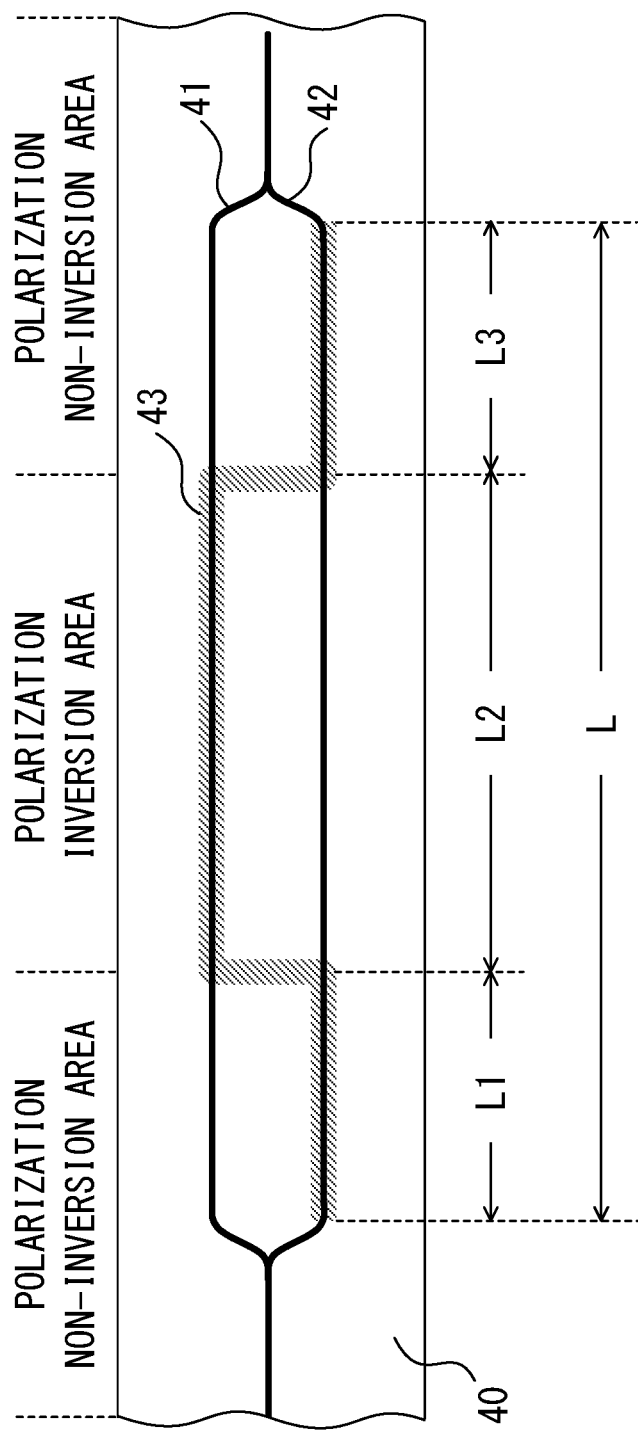
FIG. 8 illustrates an example of a configuration for suppressing chirp of an optical modulator.

FIG. 8 illustrates an example of a configuration that suppresses chirp in an optical modulator. In this example, a Mach-Zehnder modulator is formed on the surface area of a substrate 40. The Mach-Zehnder modulator includes a pair of optical waveguides 41 and 42, and a signal electrode 43. A polarization inversion area is formed on part of the substrate 40. As described above, polarization inversion area is formed by applying a high voltage to the substrate 40 under a specified condition.

It is preferable that the polarization inversion area be formed in the middle of a Mach-Zehnder modulator in the longitudinal direction. In the example illustrated in FIG. 8, it is preferable that length L3 of the modulation area formed on the input side of the polarization inversion area and length L1 of the modulation area formed on the output side of the polarization inversion area be identical or approximately identical to each other. Additionally, it is preferable that length L2 of the polarization inversion area in the longitudinal direction of the substrate 40 be roughly half length L of the modulation area of the Mach-Zehnder modulator. That is to say, it is preferable that length L2 be identical or approximately identical to a sum of L1 and L3. Note that a modulation area is an area in which an optical waveguide is formed so as to form a Mach-Zehnder modulator, and is a portion in which a data signal fed to a signal electrode changes the optical characteristic. In other words, the modulation area refers to an area in which a signal electrode is formed along an optical waveguide that forms a Mach-Zehnder modulator.

The signal electrode 43 is provided near an optical waveguide that forms a Mach-Zehnder modulator. However, the signal electrode 43 is formed near one of the optical waveguides in the polarization non-inversion areas, and is formed near the other one of the optical waveguides in the polarization inversion area. In the example illustrated in FIG. 8, the signal electrode 43 is formed along the optical waveguides 42 in the polarization non-inversion areas, and the signal electrode 43 is formed along the optical waveguide 41 in the polarization inversion area.

Figure 9:
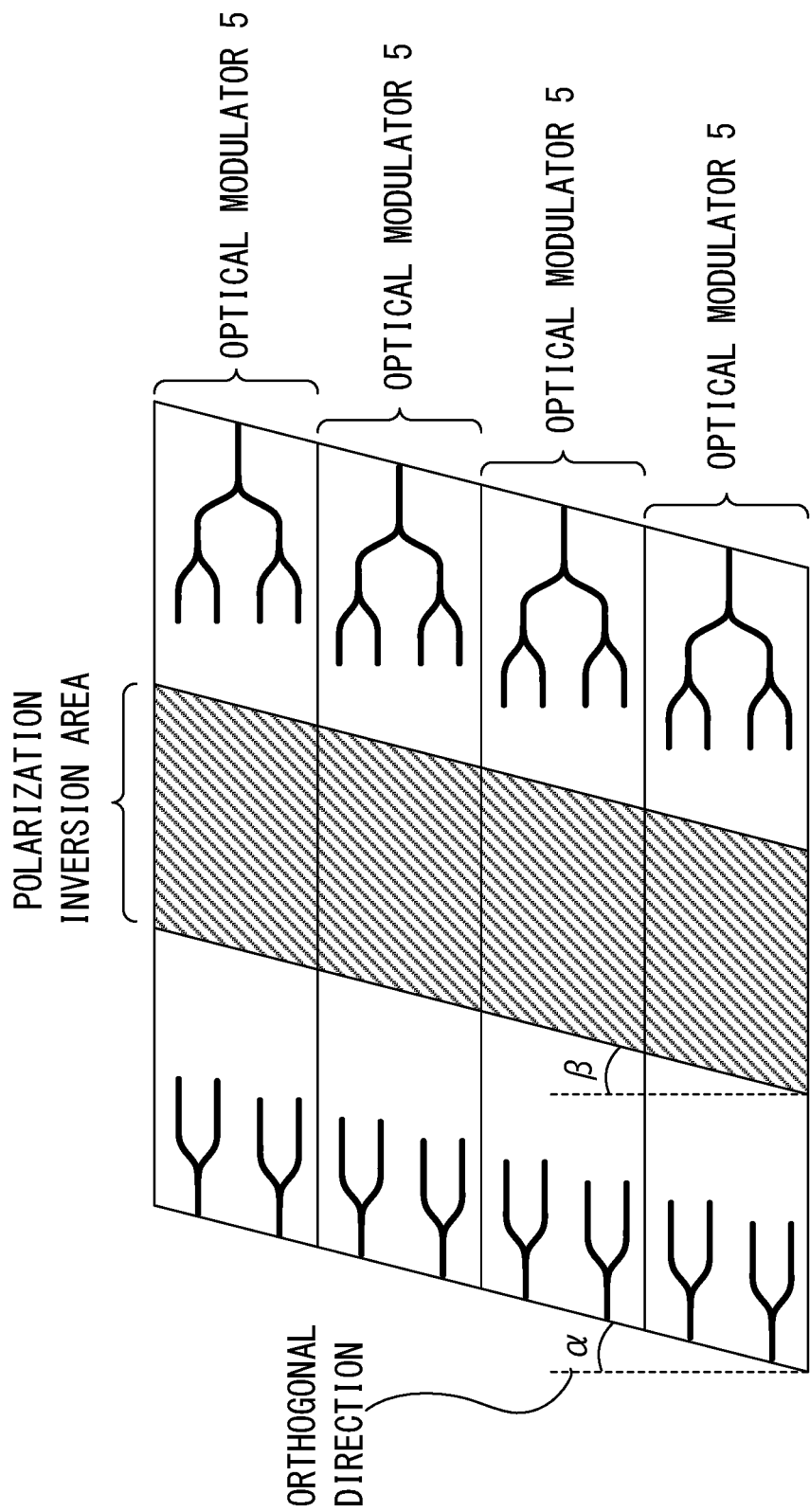
FIG. 9 illustrates an example of a method of forming a polarization inversion area.

FIG. 9 illustrates an example of a method of forming a polarization inversion area. In this example, a plurality of optical modulators are simultaneously formed on a wafer in order to improve the efficiency of the manufacturing process. When the shape of the substrate on which optical modulators are formed is parallelogrammic, the shape of the polarization inversion area may also be parallelogrammic. Further, in order to simplify the shape of a mask pattern for forming a polarization inversion area, the polarization inversion area is formed so that the inclined sides of the polarization inversion area is parallel to the side of the input edge or the output edge. In other words, a polarization inversion area is formed so that $\alpha=\beta$ is satisfied in FIG. 9.

Figure 10:
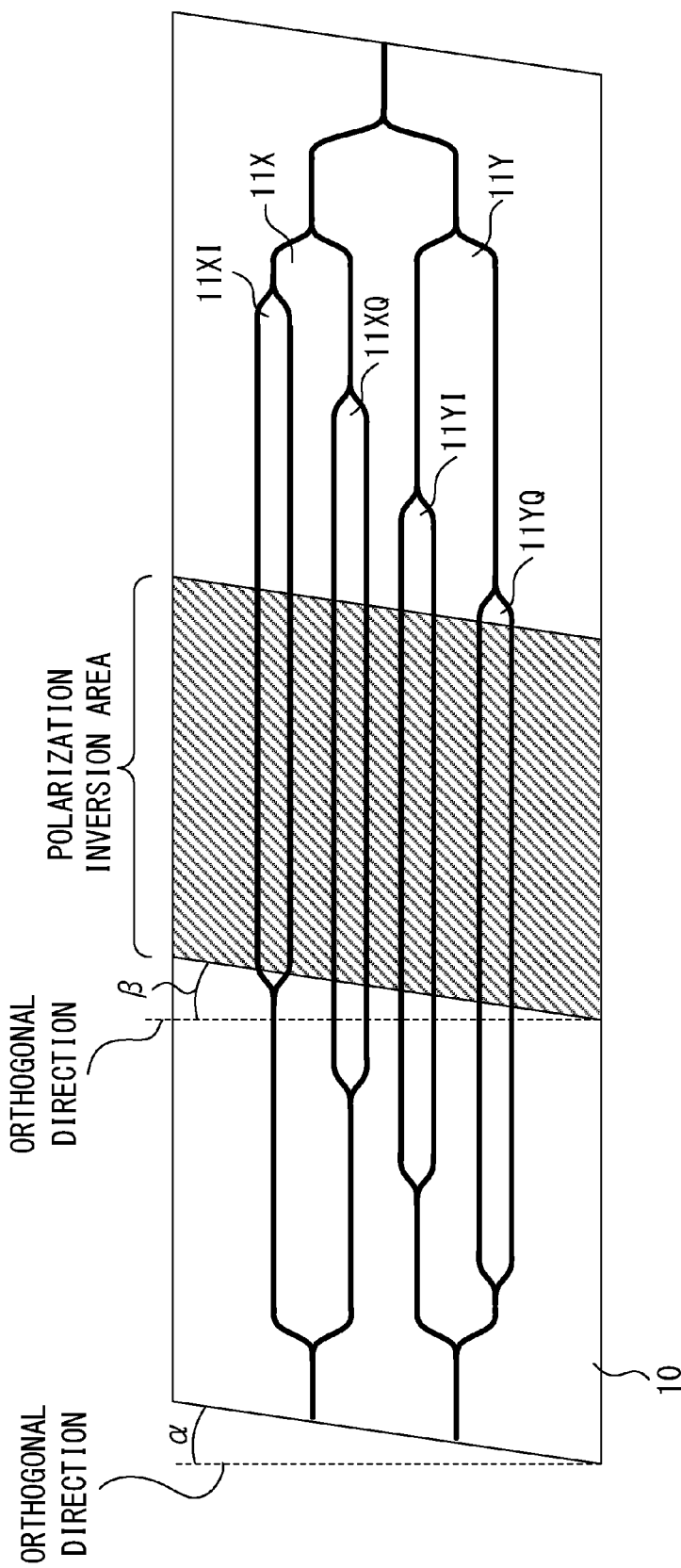
FIG. 10 illustrates a configuration in which a parallelogrammic polarization inversion area is formed on the optical modulator of the first embodiment.

FIG. 10 illustrates a configuration in which a parallelogrammic polarization inversion area is formed for the optical modulator of the first embodiment. The shaded area represents the polarization inversion area. The polarization inversion area is formed so that $\alpha=\beta$ is satisfied. Note that signal electrodes (modulation electrodes 12, the feeder electrodes 15 and the termination electrodes 16) are omitted in FIG. 10.

Figure 2:
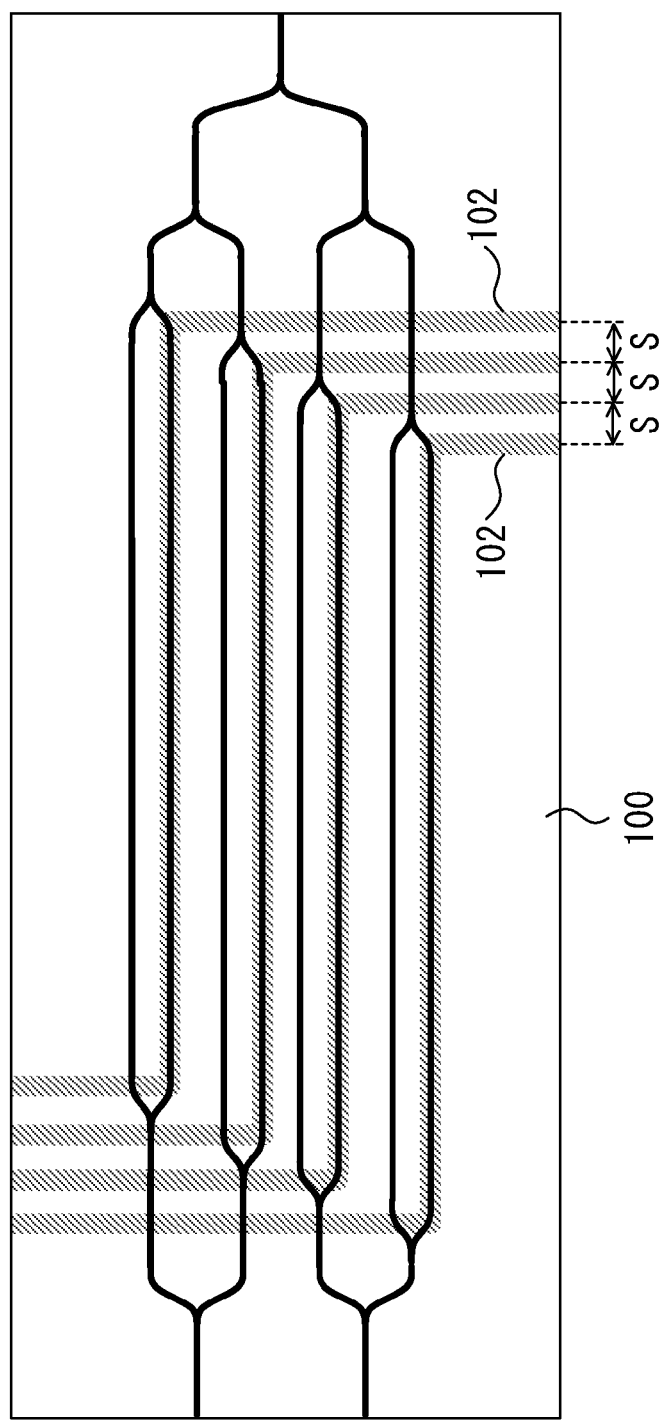
FIG. 2 illustrates an example of signal electrodes on an optical modulator.

In the optical modulator according to the first embodiment, the arrangement of the Mach-Zehnder modulators 11XI, 11XQ, 11YI and 11YQ is determined in accordance with the spacing between terminals T1, T2, T3 and T4 in the connector 20. This makes the positional shifts larger between the Mach-Zehnder modulators 11XI, 11XQ, 11YI and 11YQ in the longitudinal direction of the substrate 10 in comparison with the configurations illustrated in FIGS. 1-3. Thus, when a parallelogrammic polarization inversion areas is simply formed on the optical modulator according to the first embodiment, the parallelogrammic polarization inversion area is shifted from the middle portions of some of the Mach-Zehnder modulators. In the Mach-Zehnder modulator 11XI for example, the modulation area on the output side of the polarization inversion area is shorter than the modulation area on the input side of the polarization inversion area. On the other hand, in the Mach-Zehnder modulator 11YQ, the modulation area on the input side of the polarization inversion area is shorter than the modulation area on the output side of the polarization inversion area. Shifting the position of the polarization inversion area from a center of the modulation portion of a Mach-Zehnder modulator leads to a possibility that chirp will not be suppressed sufficiently for high-frequency signals. In response to this, the second embodiment designs the position and the shape of a polarization inversion area so that chirp of each Mach-Zehnder modulator is suppressed sufficiently.

Figure 11:
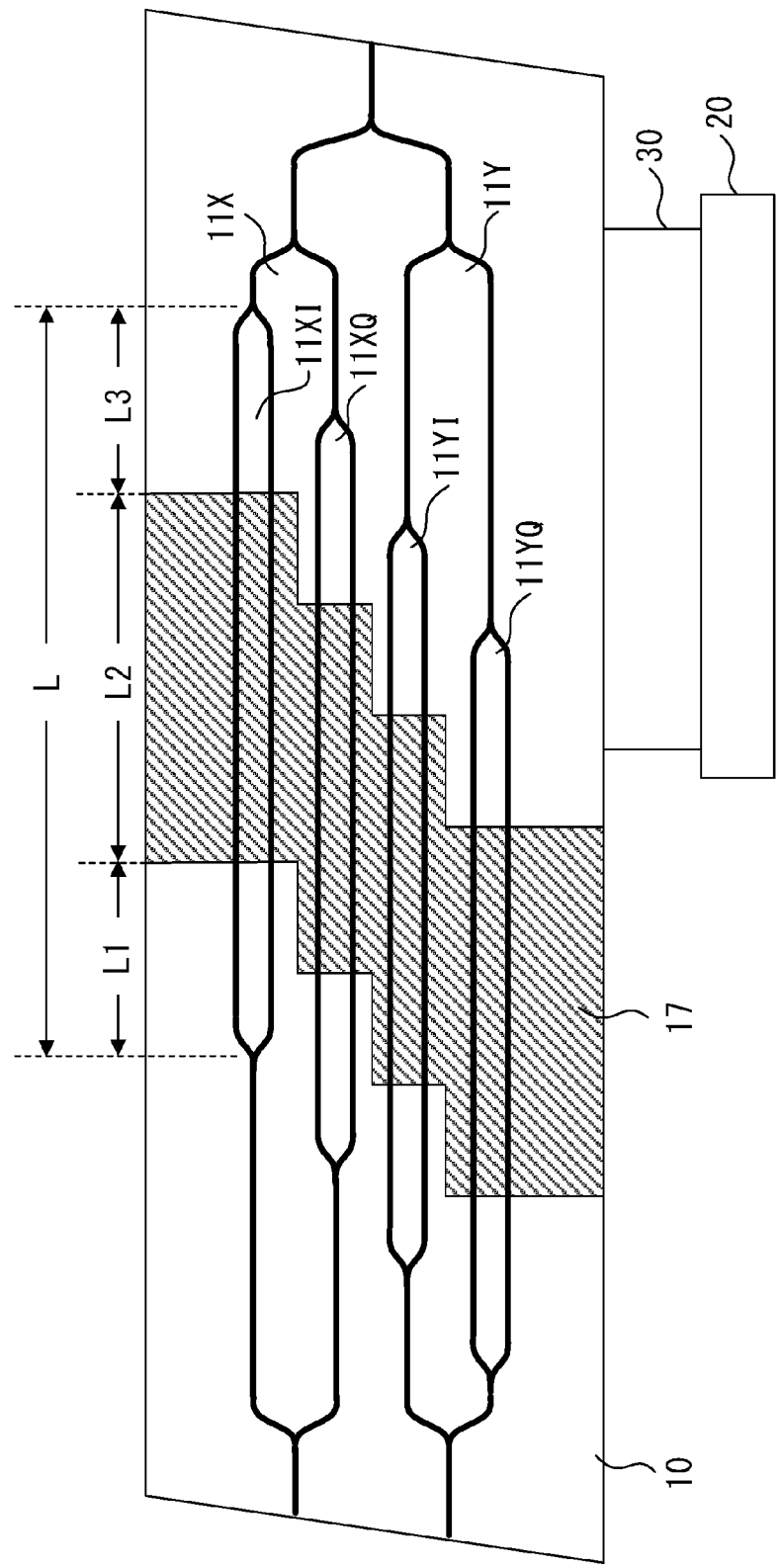
FIG. 11 illustrates an example of an optical modulator module according to a second embodiment.

FIG. 11 illustrates an example of an optical modulator module according to the second embodiment. However, in FIG. 11, signal electrodes (the modulation electrodes 12, the feeder electrodes 15 and the termination electrodes 16) are omitted. Also, the connector 20 and the relay board 30 are substantially the same between the first and second embodiments.

According to the second embodiment, a polarization inversion area 17 is formed stepwisely so that the polarization inversion area 17 is formed roughly in the middle portion of each of the Mach-Zehnder modulators 11XI, 11XQ, 11YI and 11YQ. The signal electrode of each Mach-Zehnder modulator has a configuration similar to that of the example illustrated in FIG. 8. In other words, in each Mach-Zehnder modulator, a signal electrode is formed along one of the optical waveguides in the polarization non-inversion area and the signal electrode is formed along the other one of the optical waveguides in the polarization inversion area 17. For example, a signal electrode is formed along the optical waveguide on the lower arm side in the polarization non-inversion area and the signal electrode is formed along the optical waveguide on the upper arm side in the polarization inversion area 17. Also, in each Mach-Zehnder modulator, a length of the polarization inversion area 17 is half of approximately half of the modulation area in the longitudinal direction of the substrate 10. This results in suppression of chirp of each of the Mach-Zehnder modulators 11XI, 11XQ, 11YI and 11YQ.

Note that while four rectangular areas are connected to implement the shape of the polarization inversion area 17 in the example illustrated in FIG. 11, the second embodiment is not limited to this configuration. For example, a substantially stepwise polarization inversion area may be formed by connecting four parallelogrammic areas.

Figure 12:
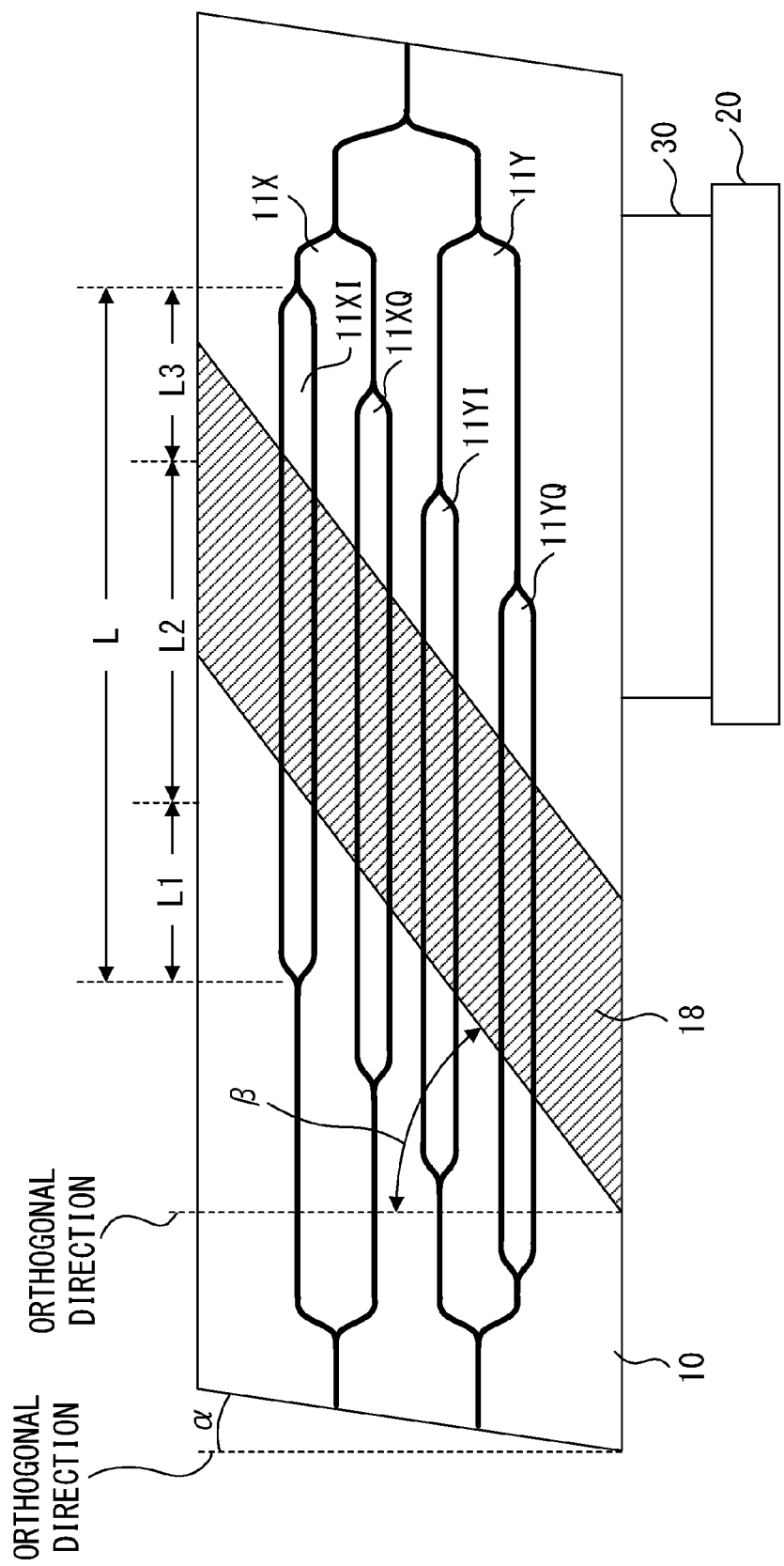
FIG. 12 illustrates a variation example of the optical modulator module of the second embodiment.

FIG. 12 illustrates a variation example of the optical modulator module of the second embodiment. In the example illustrated in FIG. 12, the shape of a polarization inversion area 18 is parallelogrammic. However in the example illustrated in FIG. 12, differently from the configuration illustrated in FIG. 10, the polarization inversion area 18 is formed so that it is formed roughly in the middle portions of the modulation areas of the Mach-Zehnder modulators 11XI, 11XQ, 11YI and 11YQ. Specifically, the shape of the polarization inversion area 18 is determined so that angle β of the oblique side of the polarization inversion area 18 with respect to the orthogonal direction is greater than angle α of the input edge/output edge with respect to the orthogonal direction. This configuration can also suppress chirp of the Mach-Zehnder modulators 11XI, 11XQ, 11YI and 11YQ.

Other Embodiments

The plurality of wiring patterns 31 formed on the surface of the relay board 30 do not always have to be parallel to each other. However, it is preferable that the wiring patterns 31 be straight or approximately straight. Also, the plurality of feeder electrodes 15 formed on the surface of the substrate 10 do not always have to be parallel to each other. However, it is preferable that the feeder electrodes 15 be straight or approximately straight. Further, the wiring patterns 31 and their corresponding feeder electrodes 15 do not always have to be arranged in one straight line. In other words, the wiring patterns 31 and their corresponding feeder electrodes 15 may be arranged at arbitrary angles.

The relay board 30 may be configured by a plurality of sub boards. For example, one sub board may be provided for each of the terminals of the connector 20. In such a case, the wiring pattern 31 is formed on each of the sub boards. Also, the wiring patterns 31 formed on the sub boards are electrically connected to their corresponding feeder electrodes 15.

As described above, the embodiments of the present invention (the first embodiment, the second embodiment and the other embodiments) suppress attenuation of a data signal fed to each optical modulator via a connector in an optical modulator module including a relay board between a substrate on which a plurality of optical modulators are formed and a connector to which the data signal is input.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical modulator module comprising:
   a substrate in which a plurality of optical modulators are formed;
   a connector configured to include a plurality of terminals to which a plurality of signals for driving the plurality of optical modulators are input; and
   a relay board provided between the substrate and the connector, wherein
   each of the optical modulators includes an optical waveguide, a modulation electrode formed near the optical waveguide, and a feeder electrode electrically connected to one end of the modulation electrode,
   the plurality of terminals are arranged in parallel or approximately parallel to a longitudinal direction of the substrate,
   positions of respective ends of the modulation electrodes at which the respective feeder electrodes of respective optical modulators are electrically connected are substantially the same as positions at which the respective terminals are provided in the longitudinal direction of the substrate,
   a plurality of wiring patterns are formed on the relay board so as to electrically connect the plurality of terminals to the respective feeder electrodes of the optical modulators, and
   the plurality of optical modulators are arranged in parallel or approximately parallel to the longitudinal direction of the substrate and are arranged at positions that are shifted in sequence in accordance with spacing between the terminals of the connector in the longitudinal direction.

2. The optical modulator module according to claim 1, wherein
   the plurality of wiring patterns are formed to be parallel or approximately parallel to each other on the relay board.

3. An optical modulator module comprising:
   a substrate in which a plurality of optical modulators are formed;
   a connector configured to include a plurality of terminals to which a plurality of signals for driving the plurality of optical modulators are input; and
   a relay board provided between the substrate and the connector, wherein
   each of the optical modulators includes an optical waveguide, a modulation electrode formed near the optical waveguide, and a feeder electrode electrically connected to one end of the modulation electrode,
   the plurality of terminals are arranged in parallel or approximately parallel to a longitudinal direction of the substrate,
   positions of respective ends of the modulation electrodes at which the respective feeder electrodes of respective optical modulators are electrically connected are substantially the same as positions at which the respective terminals are provided in the longitudinal direction of the substrate,
   a plurality of wiring patterns are formed on the relay board so as to electrically connect the plurality of terminals to the respective feeder electrodes of the optical modulators,
   a first optical modulator, a second optical modulator, a third optical modulator and a fourth optical modulator are formed in the substrate, the connector includes a first terminal, a second terminal, a third terminal and a fourth terminal corresponding to the first optical modulator, the second optical modulator, the third optical modulator and the fourth optical modulator, the first optical modulator, the second optical modulator, the third optical modulator and the fourth optical modulator are arranged in sequence along the longitudinal direction of the substrate, and a positional shifting amount of the second optical modulator with respect to the first optical modulator in the longitudinal direction of the substrate is equal or approximately equal to spacing between the first terminal and the second terminal, a positional shifting amount of the third optical modulator with respect to the second optical modulator in the longitudinal direction of the substrate is equal or approximately equal to spacing between the second terminal and the third terminal, and a positional shifting amount of the fourth optical modulator with respect to the third optical modulator in the longitudinal direction of the substrate is equal or approximately equal to spacing between the third terminal and the fourth terminal.

4. The optical modulator module according to claim 1, wherein
a stepwise polarization inversion area is formed on the substrate so that the polarization inversion area is disposed approximately in middle portions of the respective optical modulators.

5. The optical modulator module according to claim 1, wherein
a parallelogrammic polarization inversion area is formed on the substrate so that the polarization inversion area is disposed approximately in middle portions of the respective optical modulators.

6. An optical transmitter including a signal generation circuit configured to generate a plurality of drive signals and an optical modulator module configured to be driven in accordance with the plurality of drive signals, wherein
the optical modulator module includes:
a substrate in which a plurality of optical modulators driven in accordance with the plurality of drive signals are formed;
a connector configured to include a plurality of terminals to which the plurality of drive signals are input; and
a relay board provided between the substrate and the connector, wherein
each of the optical modulators includes an optical waveguide, a modulation electrode formed near the optical waveguide, and a feeder electrode electrically connected to one end of the modulation electrode,
the plurality of terminals are arranged in parallel or approximately parallel to a longitudinal direction of the substrate,
positions of respective ends of the modulation electrodes at which the respective feeder electrodes of respective optical modulators are electrically connected are substantially the same as positions at which the respective terminals are provided in the longitudinal direction of the substrate,
a plurality of wiring patterns are formed on the relay board so as to electrically connect the plurality of terminals to the respective feeder electrodes of the optical modulators, and
the signal generation circuit adjusts phases or timings of the plurality of drive signals so that differences of lengths of transmission routes of the plurality of drive signals between the connector and the plurality of optical modulators are compensated for.

* * * * *